UNITED STATES PATENT OFFICE 2,473,563

PREPARATION OF MANGANESE DIOXIDE

Maurice Beja and René Albert Loisy, Salindres, France, assignors to Compagnie de Produits Chimiques et Electrometallurgiques Alais Froges et Camargue, Paris, France, a joint-stock corporation of France No Drawing. Application April 2, 1946, Serial No. 659,130. In France March 6, 1944

2 Claims. (Cl. 23—145)

The present invention relates to the preparation of depolarizing manganese dioxide for electric batteries.

It has already been suggested, for this purpose, to reduce pyrolusite by calcination, with or without a reducing agent, this treatment being carried out until the $MnO_2$ is transformed into $Mn_2O_3$ or into $Mn_3O_4$, or both, and then to subject the reduced mass thus obtained to the action of an acid, preferably sulfuric acid, so as to dissolve MnO. The insoluble residue that is finally obtained, which is essentially constituted by $MnO_2$, has a high depolarizing power. But this method permits of obtaining only one third, or at most one half, of the manganese present in the matter treated in the form of depolarizing dioxide, the remainder of this manganese being dissolved in the form of bivalent manganese salt.

The object of the present invention is to provide a method of preparing depolarizing manganese dioxide which ensures the transformation into this product of a higher proportion of the manganese present in the matter treated.

Our method is based on the fact that higher amounts of depolarizing manganese dioxide can be obtained by treating with gaseous chlorine an aqueous suspension of pyrolusite subjected to a reducing treatment as above set forth, or of minerals or compounds containing manganese in the state of MnO or in which the proportion of oxygen is lower than that existing in manganese dioxide.

Thus, according to our invention, depolarizing manganese dioxide is obtained according to the following reactions:

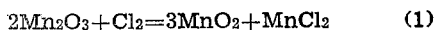
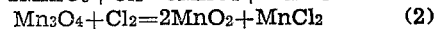
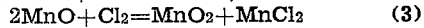

$$2Mn_2O_3 + Cl_2 = 3MnO_2 + MnCl_2 \quad (1)$$
$$Mn_3O_4 + Cl_2 = 2MnO_2 + MnCl_2 \quad (2)$$
$$2MnO + Cl_2 = MnO_2 + MnCl_2 \quad (3)$$

These reactions are exothermic and they take place easily. They may be carried out at temperatures ranging from ordinary temperature to the boiling point of the solution under either atmospheric pressure or a higher pressure. We deem it preferable to carry out the reaction at a temperature of about 70° C.

According to a modification of our invention, we make use of solutions of manganese chloride instead of pure water for bringing into suspension the reduced manganese mineral, as we have found that oxidation under the effect of chlorine takes place more easily in this case.

While with the prior method above referred to, $Mn_2O_3$ treated by sulfuric acid yields only an amount of active manganese dioxide corresponding to 50 per cent of the total amount of manganese present in the starting material, the treatment by means of chlorine according to the above reaction (1) permits of transforming 75 per cent of this manganese into active dioxide.

Similarly, the treatment of $Mn_3O_4$ by sulfuric acid permits of utilizing only one third of the manganese treated for the production of depolarizing dioxide, while the treatment with chlorine according to our invention permits of utilizing two thirds of this manganese for the same purpose.

If the starting material consists of a mineral or compounds containing manganese in the bivalent state, for instance manganese carbonate, this matter will be calcined in an oxidizing medium, so as to bring the manganese into the form of $Mn_2O_3$ or $Mn_3O_4$. The resulting product will then be attacked by chlorine as above set forth.

We are now going to give an example of the method according to our invention.

*Example.*—A pyrolusite that has been reduced by calcining and contains 47.4 per cent of MnO and 35 per cent of $MnO_2$ is reduced into powder so as to be able to pass through a sieve of 100 mesh. It is introduced into water in such manner as to obtain a suspension of 400 gr. of solid matter per liter of water. It is then treated with chlorine, at a temperature of about 70° C., until the percentage of $MnCl_2$ in the solution no longer increases, which occurs after some hours.

After filtering and washing, the insoluble residue is dried at low temperature. An element of 15×40 mm. of this dioxide, which contains 76 per cent of $MnO_2$, gives an electromotive force of 1.62 v. By continuous discharge into a resistance of 5 ohms, it leads to a capacity of 36 amperes-minute.

According to a modification of our invention, the matter to be treated with chlorine, according to the reactions above set forth, is first subjected to the action of chlorine, then to that of an alkali or alkali-earth base, and again to that of chlorine.

In a general manner, while we have, in the above description, disclosed what we deem to be an efficient embodiment of our invention, we do not wish to be limited thereto as there might be changes made therein without departing from the principle of our invention as comprehended within the scope of the appended claims.

What we claim is:

1. A method of producing depolarizing manganese dioxide which comprises starting from a manganese dioxide of low depolarizing power, reducing this dioxide by heating into at least one manganese oxide containing a proportion of oxygen lower than that existing in manganese dioxide and higher than that existing in bivalent manganese oxide, forming an aqueous suspension of the manganese oxide thus obtained, and treating this suspension with gaseous chlorine.

2. A method of producing depolarizing manganese dioxide which comprises starting from a manganese dioxide of low depolarizing power, reducing this dioxide by heating into at least one manganese oxide containing a proportion of oxygen lower than that existing in manganese dioxide and higher than that existing in bivalent manganese oxide, forming a suspension of the manganese oxide thus obtained in an aqueous solution of manganese chloride, and treating this suspension with gaseous chlorine.

MAURICE BEJA.
RENÉ ALBERT LOISY.

REFERENCES CITED

The following references are of record in the file of this patent:

UNITED STATES PATENTS

| Number | Name | Date |
|---|---|---|
| 1,216,450 | Holmes | Feb. 20, 1917 |
| 1,218,772 | Holmes | Mar. 13, 1917 |
| 1,937,488 | Jenness | Nov. 28, 1933 |

OTHER REFERENCES

Mellor, "Inorganic and Theoretical Chemistry," vol. 12, pub. by Longmans, Green & Co., London (1932), p. 236.